United States Patent [19]

Karle et al.

[11] Patent Number: 4,916,021

[45] Date of Patent: * Apr. 10, 1990

[54] RADIATION CURED BINDERS INTERNETWORKED WITH SOFT MATERIALS

[75] Inventors: Dennis W. Karle, San Jose; Zie A. Payne, Cupertino, both of Calif.

[73] Assignee: Memorex Telex N.V., Amsterdam, Netherlands

[*] Notice: The portion of the term of this patent subsequent to Aug. 11, 2004 has been disclaimed.

[21] Appl. No.: 48,522

[22] Filed: May 6, 1987

Related U.S. Application Data

[60] Continuation of Ser. No. 454,903, Dec. 30, 1982, abandoned, which is a division of Ser. No. 240,189, Mar. 3, 1981, abandoned.

[51] Int. Cl.$^4$ .............................................. G11B 5/702
[52] U.S. Cl. .................................. 428/425.9; 427/44; 427/128; 428/694; 428/900
[58] Field of Search ............... 428/694, 900, 423.1, 428/425.9; 427/44, 128

[56] References Cited

U.S. PATENT DOCUMENTS

| | | | |
|---|---|---|---|
| 4,058,646 | 11/1977 | Vaeth | 427/128 |
| 4,286,022 | 8/1981 | Vermillion | 252/62.54 |
| 4,313,989 | 2/1982 | Suzuki | 428/694 |
| 4,335,183 | 6/1982 | Hosaka | 428/694 |
| 4,336,308 | 6/1982 | Yamada | 428/694 |
| 4,368,329 | 1/1983 | Nakajima | 428/695 |
| 4,448,846 | 5/1984 | Chung | 428/477.7 |
| 4,686,146 | 8/1987 | Karle | 428/900 |

FOREIGN PATENT DOCUMENTS

124709 9/1979 Japan .

OTHER PUBLICATIONS

"Epocryl Resin 370", *Tech. Bull*, Shell Chem. Co., 2/77.

Barclay, Jr., "Acrylated Urethane Oligomers-New Raw Materials for Adhesives", *Radiation Curing*, Aug. 1979, pp. 4-11.

*Primary Examiner*—Paul J. Thibodeau
*Attorney, Agent, or Firm*—Townsend and Townsend

[57] ABSTRACT

A novel resinous binder composition is disclosed for a magnetic recording tape. Magnetic particles are dispersed within a resinous matrix having both a hard and soft component. The hard component is fabricated by exposing a resin capable of being cured by electron beam irradiation to set the radiation forming a semi-interpenetrating network with "soft" material.

13 Claims, No Drawings

RADIATION CURED BINDERS INTERNETWORKED WITH SOFT MATERIALS

This is a continuation of Ser. No. 454,903, filed Dec. 30, 1982, now abandoned, which is a division of Ser. No. 240,189, filed 3/3/81, now abandoned.

BACKGROUND OF THE INVENTION

A great deal of inventive effort has been expended in providing suitable magnetic tapes for use as information storage media. Such tape media find use in audio systems, instrumentation systems, computer systems and video systems. They usually comprise a passive backing sheet and an active, i.e. magnetic, coating on the backing sheet.

During use, these tapes are subjected to rather large mechanical stresses caused by quick-accelerating winding devices, abrasion from static parts associated with reading apparatus, cleaning blades, contact with guides, etc. These stresses most commonly cause an eventual wear of the magnetic coating which may manifest itself by spurious errors appearing in the information stored on the tape. Such errors can be drop-out (the loss of information) or drop-in (the spurious addition of information).

One of the most fruitful areas for improving magnetic tape performance has been formulation of improved binder systems for carrying electromagnetic particles which form the information-carrying component of the tapes. The binder must adhere to a backing film, for example, poly(ethyleneterephthalate)-type substrates, and provide an abrasion-resistant, oil-resistant material of good physical properties.

It has been taught in the prior art that in order to obtain sufficient durability and/or performance for magnetic media applications, it is necessary to cross-link or cure the binder material. Cross-linking is defined as the attachment of two chains of polymer molecules by bridges composed of either an element, a group or a compound which joins certain atoms of the chains by primary chemical bonds. Generally, cross-linking is required to impart sufficient toughness (area under the stress/strain curve) or to impart an appropriate soft/hard segment ratio to the binder system for the particular application. It is recognized that cross-linking decreases elongation and increases strength and resistance to thermal, environmental, hydrolytic and chemical attack. It is the balance between tensile strength and elongation that is necessary to define or quantize the toughness required for a given media application. Presently, cross-linking is achieved through a combination of chemical and thermal operations.

Poly(vinylchloride) was one of the first polymers to be used in forming binders for tapes, but that material lacked a number of desirable physical properties and also tended to degrade in the presence of iron oxide particles embedded within the polymer matrix. More recently, tape development work has been done using a large number of polymers. Linear thermoplastic polyurethanes of the polyester and polyether types are probably the most common major components of magnetic media binder systems. Polyurethane materials were recognized as contributing desirable chemical resistance (as to cleaning solvents) to the tape systems and also imparted desirable physical properties, such as abrasion resistance, to the tape. B. F. Goodrich offers a number of polyurethanes sold under the trade name ESTANE, which are polyurethanes of either the polyester or polyether type. As taught in U.S. Pat. No. 4,020,227, prior art binders have included, besides polyurethanes, polyurethane/vinyl chloride-vinyl acetate-vinyl alcohol copolymer combinations, polyurethane/phenoxy combinations, polyurethane/vinylidene chloride-acrylonitrile copolymers, as well as vinyl chloride-vinyl acetate-vinyl alcohol copolymer/acrylonitrile butadiene copolymers.

The cross-linking carried out to produce acceptable binder components has been achieved through a combination of chemical and thermal operations. They primarily employ multifunctional isocyanates to impart an appropriate degree of cross-linking or toughness to achieve a proper soft/hard segment ratio consistent with the particular application intended for the given tape. Although the exact mechanism of cross-linking is unknown because of the complexity of the systems involved it is generally thought to occur via the reaction of "active hydrogen" groups of the binder or binder combination with the multifunctional isocyanates. Active hydrogen groups found both in polyurethanes and phenoxy resins, a common combination, have included such active moieties as —NHC(O)0—, —NHC(O)NH—, —OH, —COOH and —NH—. Reaction with these groups can result in cross-linking via formation of allophanate, biuret, urethane and urea linkages.

It is commonly known that isocyanates are extremely sensitive to water. The active isocyanate groups react with water molecules according to the following equations:

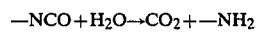

—NCO + H₂O → CO₂ + —NH₂

—NH₂ + —NCO →

$$-\text{NHCNH}-$$ (with O double-bonded to C)

As a result of this, prior art processes have been constrained in the use of isocyanates and have turned to certain catalysts such as ferric acetylacetonate which favors allophanation rather than the reaction of the isocyanate with water. Furthermore, the use of isocyanate-containing resins for use as binders for magnetic tapes impose certain distinct process constraints. The coatings begin to harden spontaneously as cross-linking takes place and coating operations including the calendering of the binder layer surface must be accomplished during a narrow process window before a significant degree of cross-linking has occurred.

It is thus an object of the present invention to disclose a novel magnetic tape binder layer without the disadvantages outlined above.

It is a further object of the present invention to disclose a novel magnetic tape binder layer which is not highly dependent upon environmental constraints including the moisture content of the ambient surroundings.

It is yet another object of the present invention to disclose a novel magnetic binder layer which can be "hardened" at any time chosen by the process operator, even after all of the coating and calendering operations have taken place.

It is still another object of the present invention to disclose a novel magnetic tape binder layer which has both a hard and soft component so that the binder can be tailored to a specific end use, said components forming a semi-interpenetrating polymer network.

It is yet another object of the present invention to disclose a binder layer for magnetic tape which is hardened or cured solely through the use of electron beam irradiation.

BRIEF DESCRIPTION OF THE INVENTION

The present invention comprises a composition of matter useful as a binder for magnetic particles of a magnetic recording tape and the novel recording tape formed by using said composition. The composition comprises a matrix resin in the form of a semi-interpenetrating network comprising a hard component and a soft component whereby the hard component has been formed by electron beam curing. Preferably, the soft component comprises a polyurethane which is incapable of curing upon exposure of electron beam irradiation and a second component which is electron beam irradiation sensitive. Ideally, the second component is a resin of acrylate ester epoxy or acrylate urethane.

DETAILED DESCRIPTION OF THE INVENTION

The prior art has recognized the use of electron beam irradiation curable materials for use as binder layers for magnetic tapes. For example, Japanese Pat. No. 54-124709 discloses the use of materials having terminal acrylate or methacrylate groups, which are cross-linked by electron beam irradiation forming a rather brittle tough binder layer with little elongation.

Unlike the present invention, the subject Japanese patent fails to disclose a "soft" segment incorporated in its binder layer. By contrast, the present binder layer contains a reactive material and a non-reactive material, which upon complete cure results in an interaction between the materials and hence a soft/hard segment binder system which can be tailored to specific media application. This has been called a semi-interpenetrating polymer network, which is actually an intimate mixture of two or more distinct polymer networks that cannot be physically separated. This allows the processing of the binder layer whereby the process engineer can control the morphology by simply varying the ratio of the soft and hard components.

Japanese Pat. No. 47-12423 teaches a binder layer for a magnetic recording tape comprised of acrylate copolymers or homopolymers/polyester mixtures in combination with reactive monomers. It is believed that the acrylates as taught in this Japanese patent have been included therein to decrease the minimum dosage required to cross-link the polymeric species. It is well known to those skilled in the art that monomeric acrylates or methacrylates will decrease the minimum dosage required to cross-link polymeric species. See, for example, British Pat. No. 1,287,143. Unsaturated (backbone unsaturated) poly-esters do not cross-link at low dosages without the co-addition of acrylate materials as taught by S. H. Schroeter, *Radiation Curing of Coatings*, p. 117–120. Since Japanese Pat. No. 47-12423 contains low molecular weight acrylates, the polyester therein should cross-link under the conditions listed therein. As such, the composition will be substantially completely reactive.

Japanese Pat. No. 47-12423 can be of a nature where either all of the disclosed materials are reactive or where there are some non-reactive materials present. When all of the materials are reactive, i.e., where there is a reactive monomer, cross-linkable polyester and polymeric acrylate with free acrylate groups, a binder layer would be formed which is highly cross-linked with no soft segment. In the case where there are non-reactive materials present such as oligomeric acrylates, or non-reactive polyesters, debris would form part of the binder layer which would seriously degrade the integrity of the cross-linked species and be detrimental to the binder layer in toto. By contrast, the present invention contains high molecular weight non-reactive components which will not generate debris.

The present invention discloses a binder for a magnetic tape which does not rely upon chemical or thermal cross-linking in its manufacture, but instead employs particulate irradiation in the form of electron beam irradiation to cure the binder. The electron beam irradiation can be accomplished in any manner which, upon reviewing the present disclosure, would be obvious to one skilled in the art. For example, a binder layer prepared according to the present invention can be cured by employing the Electrocurtain process of Energy Sciences, Inc. or one could even employ a magnetically scan system such as that offered by High Voltage Engineering.

Resin materials suitable as matrices for radiation cure can be classified as to position of the radiation curable moiety, such as (1) backbone group, (2) pendant group, and (3) terminal group. It has been observed that the terminal groups are more effective in achieving the objectives of the present invention. Of the electron beam curable resins, the most preferred materials are acrylate ester epoxy resins and acrylate urethanes. Although curing at a slower rate, methacrylate ester epoxy resins and methacrylate urethanes are useful in practicing the present invention. The most preferred materials can be represented by the following structures:

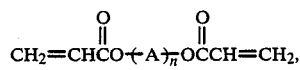

n=approximately 1 to 20 wherein A is

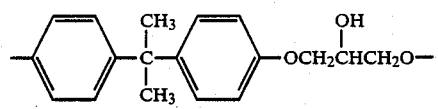

or a urethane of structure such as:

wherein: $R_2$ is an aliphatic group such as derived from 2-hydroxyethyl acrylate, 2-hydroxyethyl methacrylate, 3-hydroxypropyl acrylate and the like.

$R_1$ is an aliphatic or aromatic group derived from a multifunctional isocyanate such as toluene-2,4-diisocyanate, toluene-2,6-diisocyanate, diphenylmethane-4,4'-diisocyanate, 3,3'-dimethylbiphenyl-4,4'-diisocyanate, hexamethylene diisocyanate and the like.

R is a liquid polyester derived from the reaction of a polyhydric alcohol such as ethylene glycol, 1,3-propanediol, 1,4-butanediol and the like with a polycarboxylic acid such as adipic acid, sebacic acid, glutaric acid, pimelic acid, azelaic acid, suberic acid, terephthalic acid and the like.

The following table represents commercially available electron beam curable materials suitable in practicing the present invention:

TABLE I
COMMERCIALLY AVAILABLE ELECTRON BEAM CURABLE MATERIALS

| Trade Name Identification | Type[a] | Source |
|---|---|---|
| Epocryl 370 | AE | Shell |
| Celrad 3700 | AE | Celanese |
| Celrad 3702 | AE | Celanese |
| Uvithane 782 | AU | Thiokol |
| Uvithane 783 | AU | Thiokol |
| Uvithane 788 | AU | Thiokol |
| Uvithane 893 | AU | Thiokol |
| Hughson 753401-1F | AU | Lord |
| Hughson TS2935-71 | AU | Lord |

[a]AE = Acrylate ester epoxy, AU = Acrylate urethane.

Typical of acrylate ester epoxy resins suitable for practicing the present invention is Epocryl 370 available from the Shell Chemical Company. This resin is formed by reacting acrylic acid with a diepoxide, the product of bis-phenol A with epichlorohydrin. Uvithane is typical of the acrylate urethanes. Uvithane is available from Thiokol and is a proprietary composition likely being hydroxyalkyl acrylate-toluene diisocyanate-polyethylene adipate adducts with terminal acrylate groups. Typical polyurethanes for use with the electron beam curable components are, for example, Estane 5701 available from B. F. Goodrich, which is a polyester-type polyurethane, Morthane CA-250HV, which is a polyurethane of the polyester-type available from Morton Chemical Company and Plastothane 540, a polyester-type polyurethane available from Thiokol, Inc.

Working Examples

Before the actual examples are presented, several preliminary explanatory notes are in order.

All coatings and free films of the present examples were cross-linked or cured by exposure to electron beam irradiation using the Electrocurtain Process. This process employs a compact source of energetic electrons and may be viewed as a rather large triode vacuum tube. A grid-controlled curtain of electrons generated by an electron gun was subjected to an acceleration voltage of up to 200 kv and passed through a metal foil "window" on to air and finally to the product. It should be quite obvious that the compositions of matter herein disclosed are capable of experiencing cross-linking or cure through the use of other electron beam irradiation sources.

Irradiations were performed at several levels of dosage. Dosage is defined as the amount of radiation being absorbed per unit mass of material, the unit of dosage being the rad or the energy absorption of 100 ergs per gram of material. In the following examples, dosages were employed in the range of 1 to 15 megarad; megarad being one million rads or $10^8$ ergs per gram.

Various methods of binder layer fabrication were carried out to achieve dispersions acceptable for magnetic tape fabrication. In all methods, after an acceptable dispersion was obtained, the mixture was separated and/or drained from the dispersion medium whereafter various additives appropriate for each end use were added. The mixtures were then coated on polyethylene terephthalate and subjected to particle orientation. The coating was then dried and surface treated (calendered). The coating thus obtained were cross-linked by exposure to electron beam irradiation at doses of 1 to 15 megarads in an inert atmosphere using the Electrocurtain Process.

The quantities of materials which were employed were manipulated so as to achieve final coating compositions as recited in Table II below. In each case, cyclohexanone was added to give a final coating solids of 32 to 40 percent in a minimum theoretical mix weight of 500 grams. Sufficient polyester-polyurethane resin was dissolved in cyclohexanone with stirring to produce a solution of 15 percent solids by weight.

As noted from viewing Table II, examples 1, 3, 4, 7, 9, 12–16, 23 and 34–36 illustrate the use of acrylate ester epoxy (AE) combinations, while examples 2, 5, 6, 8, 10, 11, 17–22 and 24 illustrate the use of acrylate urethane (AU) combinations. Other examples, namely, 25–31, illustrate the use of various other materials, such as amino-functional butadiene/acrylonitrile copolymers (ABAN), carboxylated butadiene/acrylonitrile copolymers (CBAN), polyacrylates (A), polyesters (PE) and polyurethanes (U). Lastly, the examples demonstrate the use of magnetic pigments having oil absorption numbers 45–90 together with various dispersion methods and binder/electron beam curable material combinations and ratios.

Each example employed one of six methods for preparing the various binder layers. They have been denominated A-F and are as follows:

METHOD A: A mixture of polyester polyurethane solution (15%) in cyclohexanone, soya lecithin, carbon black, magnetic pigment, electron beam curable material and cyclohexanone was charged into a steel container containing ⅛" steel balls. The mixture was then shaken on a paint can shaking machine, samples being removed periodically and assessed for dispersion quality using visual/microscopic techniques. After a good quality dispersion was obtained, the mixture was drained and separated from the steel balls, finaled with various additives and filtered. The mixture was then coated on polyethylene-terephthalate film, subjected to particle orientation, dried and surface treated (calendered). The coatings thus obtained were cross-linked by exposure to electron beam irradiation at dosages of 1 to 15 megarad under an inert atmosphere using the Electrocurtain Process.

METHOD B: A mixture of polyester polyurethane solution (15%) in cyclohexanone, soya lecithin, carbon black, magnetic pigment and cyclohexanone was charged into a steel container containing ⅛" steel balls. The mixture was then shaken on a paint can shaking machine, samples being removed periodcally and assessed for dispersion quality using visual/microscopic techniques. After a good quality dispersion was obtained, the electron beam curable oligomer and cyclohexanone was added to the mixture and shaking continued until a good quality dispersion was obtained. After draining and separation from the steel balls, the mixture was finaled with various additives and filtered. The mixture was then coated on polyethylene-terephthalated film, subjected to particle orientation, dried and surface treated (calendered). The coatings thus obtained were cross-linked by exposure to electron beam irradiation at dosages of 1 to 15 megarad under an inert atmosphere using the Electrocurtain Process.

METHOD C: A mixture of polyester polyurethane solution (15%) in cyclohexanone corresponding to one half total required, soya lecithin, carbon black, magnetic pigment and cyclohexanone was charged into a steel container containing ⅛" steel balls. The mixture was shaken for one hour on a paint can shaker whereupon remaining polyester polyurethane solution (15%) in cyclohexanone and electron beam curable material was added to the mixture. The resulting mixture was shaken until a good quality dispersion was obtained, samples being removed periodically and being assessed using visual/microscopic techniques. After draining and separation, the mixture was finaled with various additives and filtered. The filtered mixture was then coated on polyethylene-terephthalate film, subjected to particle orientation, dried and surface treated (calendered). The coatings thus obtained were cross-linked by exposure to electron beam irradiation at dosages of 1 to 15 megarad under an inert atmosphere using the Electrocurtain Process.

METHOD D: A mixture of soya lecithin, carbon black, magnetic pigment, and cyclohexanone was charged into a steel container containing ⅛" steel balls. The mixture was shaken for one hour on a paint can shaker whereupon a polyester polyurethane solution (15%) in cyclohexanone and additional cyclohexanone was added. The resulting mixture was shaken until a good quality dispersion was obtained, samples being removed periodically and being assessed using visual/microscopic techniques. Electron beam curable material and cyclohexanone was added and the mixture was shaken for an additional 1 to 2 hours. After draining and separation, the mixture was finaled with various additives and filtered. The filtered mixture was then coated on polyethylene-terephthalate film, subjected to particle orientation, dried and surface treated (calendered). The coatings thus obtained were cross-linked by exposure to electron beam irradiation at dosages of 1 to 15 megarad under an inert atmosphere using the Electrocurtain Process.

METHOD E: A mixture of soya lecithin, carbon black, magnetic pigment and cyclohexanone was charged into a container containing ⅛" steel balls. The mixture was shaken for one hour on a paint can shaker whereupon a polyester polyurethane solution (15%) in cyclohexanone as well as the electron beam curable material and cyclohexanone were added to the mixture. The resulting mixture was shaken until a good quality dispersion was obtained, samples being removed periodically and being assessed using visual/microscopic techniques. After draining and separation, the mixture was finaled with various additives and filtered. The filtered mixture was then coated on polyethylene-terephthalate film, subjected to particle orientation, dried and surface treated (calendered). The coatings thus obtained were cross-linked by exposure to electron beam irradiation at dosages of 1 to 15 megarad under an inert atmosphere using the Electrocurtain Process.

METHOD F: A mixture of polyester polyurethane solution (15%) in cyclohexanone, soya lecithin, conductive carbon and magnetic pigment was dispersed using a high energy dispersion process until a good quality dispersion was obtained, quality being assessed using visual/microscopic techniques. After separation and draining, additional polyester polyurethane solution (15%) in cyclohexanone, electron beam curable material, and cyclohexanone were added to the dispersion with stirring (Cowles stirrer). The resulting mixture was finaled with various additives appropriate to the application, adjusted to 35-38% solids, and filtered. The filtered mixture was then coated on polyethylene-terephthalate film, subjected to particle orientation, dried and surface treated (calendered). The coatings thus obtained were cross-linked by exposure to electron beam irradiation at dosages of 1 to 15 megarad under an inert atmosphere using the Electrocurtain Process.

The following Table II is a tabulated compilation of 36 exemplar formulations prepared according to the present invention.

TABLE II

FORMULATIONS EXAMINED

| Material | 1 | 2 | 3 | 4 | 5 | 6 | 7 | 8 | 9 | 10 | 11 | 12 |
|---|---|---|---|---|---|---|---|---|---|---|---|---|
| Estane 5701 | 13.30 | 13.30 | 13.30 | | 10.28 | 10.28 | 17.13 | 17.13 | | | | 7.19 |
| Morthane CA 250HV | | | | 13.30 | | | | | | | | |
| Plastothane 540 | | | | | | | | | | | | |
| Q-Thane PS-94M | | | | | | | | | 13.30 | 13.30 | 13.30 | |
| Vitel 6207 | | | | | | | | | | | | |
| Epocryl 370 | 7.21 | | | 7.21 | | | 3.15 | | 7.21 | | | 13.35 |
| Celrad 3700 | | | 7.21 | | | | | | | | | |
| Uvithane 783 | | | | | | | | | | 7.21 | | |
| Uvithane 788 | | 7.21 | | | 10.27 | | | 3.15 | | | | |
| Uvithane 893 | | | | | | 10.27 | | | | | 7.21 | |
| Hughson TS-34011F | | | | | | | | | | | | |
| Hughson TS 2935-71 | | | | | | | | | | | | |
| CBAN 700 | | | | | | | | | | | | |
| CBAN 730 | | | | | | | | | | | | |
| ABAN 800 | | | | | | | | | | | | |
| ABAN 810 | | | | | | | | | | | | |
| Tevista H | | | | | | | | | | | | |
| Acryloid AT 400 | | | | | | | | | | | | |
| Preparation Method | A | D | D | D | C | C | F | F | D | D | D | D |
| Binder Ratio (Resin/EB) | 65/35 | 65/35 | 65/35 | 65/35 | 50/50 | 50/50 | 85/15 | 85/15 | 65/35 | 65/35 | 65/35 | 35/65 |
| Pigment Oil Adsorption No. | 45 | 80-90 | 80-90 | 80-90 | 80-90 | 80-90 | 80-90 | 80-90 | 80-90 | 80-90 | 80-90 | 80-90 |
| Magnetic Pigment (%) | 71.32 | 71.32 | 71.32 | 71.32 | 71.33 | 71.33 | 70.89 | 70.89 | 71.32 | 71.32 | 71.32 | 71.34 |
| Additives (%) | 1.32 | 1.32 | 1.32 | 1.32 | 1.33 | 1.33 | 0.59 | 0.59 | 1.32 | 1.32 | 1.32 | 1.32 |
| Soya Lecithin (%) | 1.46 | 1.43 | 1.43 | 1.43 | 1.47 | 1.47 | 1.38 | 1.38 | 1.46 | 1.46 | 1.46 | 1.47 |
| Carbon Black (%) | 5.34 | 5.34 | 5.34 | 5.34 | 5.33 | 5.33 | 6.87 | 6.87 | 5.34 | 5.34 | 5.34 | 5.34 |
| Binder Type | U/AE | U/AU | U/AE | U/AE | U/UA | U/UA | U/AE | U/AU | U/AE | U/AU | U/AU | U/AE |

Example Number

TABLE II-continued

FORMULATIONS EXAMINED

| Material | 13 | 14 | 15 | 16 | 17 | 18 | 19 | 20 | 21 | 22 | 23 | 24 |
|---|---|---|---|---|---|---|---|---|---|---|---|---|
| Estane 5701 | 4.11 | 10.27 | 13.35 | 13.35 | 13.35 | 10.27 | 7.19 | 4.11 | 10.27 | 10.27 | 15.61 | 10.27 |
| Morthane CA 250HV | | | | | | | | | | | | |
| Plastothane 540 | | | | | | | | | | | | |
| Q-Thane PS-94M | | | | | | | | | | | | |
| Vitel 6207 | | | | | | | | | | | 1.03 | |
| Epocryl 370 | 16.43 | 10.27 | 7.19 | 7.19 | | | | | | | 3.70 | |
| Celrad 3700 | | | | | | | | | | | | |
| Uvithane 783 | | | | | | | | | | | | |
| Uvithane 788 | | | | | | | | | | | | 10.27 |
| Uvithane 893 | | | | | 7.19 | 10.27 | 13.35 | 16.43 | | | | |
| Hughson TS-34011F | | | | | | | | | 10.27 | | | |
| Hughson TS 2935-71 | | | | | | | | | | 10.27 | | |
| CBAN 700 | | | | | | | | | | | | |
| CBAN 730 | | | | | | | | | | | | |
| ABAN 800 | | | | | | | | | | | | |
| ABAN 810 | | | | | | | | | | | | |
| Tevista H | | | | | | | | | | | | |
| Acryloid AT 400 | | | | | | | | | | | | |
| Preparation Method | D | D | F | D | D | D | D | D | F | F | B | D |
| Binder Ratio (Resin/EB) | 20/80 | 50/50 | 65/35 | 65/35 | 65/35 | 50/50 | 35/65 | 20/80 | 50/50 | 50/50 | 76/5/19 | 50/50 |
| Pigment Oil Adsorption No. | 80-90 | 80-90 | 80-90 | 80-90 | 80-90 | 80-90 | 80-90 | 80-90 | 80-90 | 80-90 | 80-90 | 80-90 |
| Magnetic Pigment (%) | 71.34 | 71.34 | 71.34 | 71.34 | 71.33 | 71.33 | 71.34 | 71.34 | 71.34 | 71.34 | 71.34 | 71.34 |
| Additives (%) | 1.32 | 1.32 | 1.32 | 1.3 | 1.32 | 1.32 | 1.32 | 1.32 | 1.32 | 1.32 | 1.32 | 1.32 |
| Soya Lecithin (%) | 1.47 | 1.47 | 1.47 | 1.47 | 1.47 | 1.47 | 1.47 | 1.47 | 1.47 | 1.47 | 1.47 | 1.47 |
| Carbon Black (%) | 5.34 | 5.34 | 5.33 | 5.33 | 5.33 | 5.33 | 5.33 | 5.33 | 5.33 | 5.33 | 5.33 | 5.33 |
| Binder Type | U/AE | U/AE | U/AE | U/AE | U/AU | U/AU | U/AU | U/AU | U/AU | U/AU | U/PE/AE | U/AU |

| Material | 25 | 26 | 27 | 28 | 29 | 30 | 31 | 32 | 33 | 34 | 35 | 36 |
|---|---|---|---|---|---|---|---|---|---|---|---|---|
| Estane 5701 | 10.27 | 10.27 | 10.27 | 10.27 | 13.35 | 10.27 | 10.27 | 16.23 | | 13.25 | 13.18 | 11.85 |
| Morthane CA 250HV | | | | | | | | | | | | |
| Plastothane 540 | | | | | | 10.27 | | | 13.34 | | | |
| Q-Thane PS-94M | | | | | | | | | | | | |
| Vitel 6207 | | | | | | | | 0.21 | | | | |
| Epocryl 370 | | | | | | | | 4.12 | | 7.15 | 7.11 | 4.36 |
| Celrad 3700 | | | | | | | | | | | | |
| Uvithane 783 | | | | | | | | | | | | |
| Uvithane 788 | | | | | | | | | 7.19 | | | |
| Uvithane 893 | | | | | | | | | | | | |
| Hughson TS-34011F | | | | | | | | | | | | |
| Hughson TS 2935-71 | | | | | | | | | | | | |
| CBAN 700 | 10.27 | | | | | | | | | | | |
| CBAN 730 | | 10.27 | | | | | | | | | | |
| ABAN 800 | | | 10.27 | | | | | | | | | |
| ABAN 810 | | | | 10.27 | | | | | | | | |
| Tevista H | | | | | 7.19 | | | | | | | |
| Acryloid AT 400 | | | | | | | 10.27 | | | | | |
| Preparation Method | C | C | C | C | C | C | C | B | D | D | D | F |
| Binder Ratio (Resin/EB) | 50/50 | 50/50 | 50/50 | 50/50 | 65/35 | 50/50 | 50/50 | 79/1/20 | 65/35 | 65/35 | 65/35 | 73.5/26.5 |
| Pigment Oil Adsorption No. | 80-90 | 80-90 | 80-90 | 80-90 | 80-90 | 80-90 | 80-90 | 80-90 | 60-62 | 60-62 | 60-62 | 60-62 |
| Magnetic Pigment (%) | 71.33 | 71.33 | 71.33 | 71.33 | 71.33 | 71.33 | 71.33 | 71.34 | 71.33 | 70.87 | 70.50 | 73.37 |
| Additives (%) | 1.33 | 1.33 | 1.33 | 1.33 | 1.33 | 1.33 | 1.33 | 1.32 | 1.34 | 1.48 | 2.47 | 3.77 |
| Soya Lecithin (%) | 1.47 | 1.47 | 1.47 | 1.47 | 1.47 | 1.47 | 1.47 | 1.47 | 1.47 | 1.46 | 1.45 | 3.55 |
| Carbon Black (%) | 5.14 | 5.14 | 5.14 | 5.14 | 5.14 | 5.14 | 5.14 | 5.33 | 5.33 | 5.30 | 5.27 | 3.01 |
| Binder Type | U/B | U/B | U/B | U/B | U/PE | U/U | U/A | U/PE/AE | U/AU | U/AE | U/AE | U/AE |

A number of experimental techniques were used to evaluate the degree of cross-linking of the resinous coatings of the present invention. Applicants attempted to test coating durability as a function of electron beam radiation dosage to determine how actual formulations paralleled theoretical predictions.

Hardness was measured using a Sward Hardness Rocker G. G. Sward, Ed., "Paint Testing Manual", 13th Ed., ASTM, 1972, p. 286. Hardness of the magnetic coating was measured as a function of radiation dosage, hardness generally increasing with dosage. Table III, below, lists the hardness numbers of several representative formulations as a function of dosage.

TABLE III

HARDNESS OF REPRESENTATIVE COATINGS AS A FUNCTION OF DOSAGE

| Example No.[a] | Binder Type[b] | Hardness Number at Dosage (Megarad) | | | | | |
|---|---|---|---|---|---|---|---|
| | | 0 | 1 | 2.5 | 5 | 7.5 | 10 | 15 |
| 6 | U/UA | 23 | 27 | 31 | 39 | 37 | 37 | |
| 7 | U/AE | 28 | | 30 | | | | |
| 8 | U/AE | 29 | | 32 | | | | |
| 9 | U/AU | 29 | | 43 | 47 | 49 | | |
| 10 | U/AU | 29 | | 35 | 36 | 37 | | |
| 11 | U/AU | 31 | | 35 | 37 | 33 | | |
| 12 | U/AE | | 35 | 48 | 51 | 51 | 48 | 44 |
| 13 | U/AE | 27 | | 45 | 48 | | | |
| 14 | U/AE | 25 | 27 | 36 | 46 | 48 | 45 | |
| 15 | U/AE | 24 | 29 | 34 | 37 | 41 | 40 | |
| 16 | U/AE | 25 | 24 | 33 | 38 | 39 | 42 | 38 |
| 17 | U/AU | 28 | 28 | 28 | 30 | 28 | 26 | 26 |

TABLE III-continued
HARDNESS OF REPRESENTATIVE COATINGS AS A FUNCTION OF DOSAGE

| Example No.[a] | Binder Type[b] | Hardness Number at Dosage (Megarad) | | | | | | |
|---|---|---|---|---|---|---|---|---|
| | | 0 | 1 | 2.5 | 5 | 7.5 | 10 | 15 |
| 18 | U/AU | 21 | 28 | 28 | 30 | 31 | 29 | 31 |
| 19 | U/AU | 27 | 31 | 35 | 38 | 37 | 38 | 37 |
| 20 | U/AU | 26 | 32 | 35 | 38 | 36 | 36 | 32 |
| 21 | U/AU | 27 | 28 | 28 | 29 | 30 | 32 | 31 |
| 22 | U/AU | 25 | 24 | 27 | 31 | 31 | 33 | |
| 23 | U/PE/AE | 22 | 23 | 26 | 28 | 29 | 29 | |
| 24 | U/AU | 25 | | 36 | 37 | 37 | | |
| 29 | U/PE | 23 | | 24 | 24 | | | |
| 33 | U/AU | 33 | | 41 | 42 | | | |
| 34 | U/AE | 30 | 50 | 41 | 43 | 42 | 44 | 46 |
| 35 | U/AE | 30 | 36 | 40 | 44 | 46 | 43 | 47 |

[a]See Table II for description of example.
[b]U = urethane, AE = acrylate ester epoxy.
AU = acrylate urethane, PE = polyester.

It is an important aspect of this invention to provide a resinous binder layer which can be tailored to a particular end use application. By varying the soft and hard components, one is capable, by practicing the present invention, of preselecting and controlling the tensile strength, elongation and hardness of the binder layer as dictated by a specific end use. To test these properties, various drawdowns were made on a suitable release surface (glass or polypropylene plates) using coating mixtures and a 7-15 mil drawdown knife. After drying, samples were removed from the release surface and subjected to electron beam irradiation at dosages of 1 to 15 megarad in an inert atmosphere using the Electrocurtain Process. The irradiated samples were then cut into specimens 0.5 inches wide and 3 inches long. Thicknesses of the samples were recorded to 0.001 inches. Testing was carried out using an Instron Universal Tester (Model TM/TML) at ambient conditions and at a constant strain rate within a given test series. A minimum of seven specimens were evaluated for each experimental condition whereby tensile strength and percent elongation were measured as a function of irradiation dosage. It was noted, as a general principle, that tensile strength increased and percent elongation decreased as dosage increased. Table IV lists the mechanical properties of several coatings as a function of dosage.

TABLE IV
MECHANICAL PROPERTIES OF REPRESENTATIVE COATINGS AS A FUNCTION OF DOSAGE

| Example No.[a] | Binder Type[b] | Test | Value at Dosage (Megarad) | | | | | | |
|---|---|---|---|---|---|---|---|---|---|
| | | | 0 | 1 | 2.5 | 5 | 7.5 | 10 | 15 |
| 2[c] | U/AE | Tensile (psi) | 249 | | 696 | 852 | 910 | 990 | |
| | | % Elongation | 63 | | 8.2 | 5.9 | 5.8 | 4.0 | |
| 7 | U/AE | Tensile (psi) | 451 | 637 | 652 | 706 | 765 | 757 | |
| | | % Elongation | 21.9 | 13.5 | 10 | 10.5 | 8.4 | 8.6 | |
| 12 | U/AE | Tensile (psi) | 182 | | 861 | 1025 | 1050 | 1122 | |
| | | % Elongation | 13 | | 3.1 | 2.2 | 1.5 | 1.1 | |
| 24 | U/AU | Tensile (psi) | 399 | | 1077 | 1283 | 1407 | | |
| | | % Elongation | 13 | | 7.2 | 5.3 | 4.6 | | |

[a]See Table II for description of examples.
[b]AU = acrylate urethane, U = urethane, AE = acrylate ester epoxy.
[c]Similar to example number 2.

An attempt was made to confirm the crosslinking density or degree of cure in practicing the present invention. After removal of the magnetic coating from the base film (polyethyleneterephthalate), a weighed aliquot (0.5 grams) of said coating was extracted with chloroform (17 ml) for eight hours using a Soxhlet extractor equipped with an aluminum thimble. Chloroform was evaporated and the resulting solid dried at 105° C. for 30 minutes to give the weight of extractable material. The amount of extractable material measured as percent extractables was utilized to compare the degree of cure or cross-linking of the irradiated coatings, cross-linking being an inverse function of the amount extracted. Table V, below, lists the percentage extractables for several coatings as a function of dosage.

| Example No.[a] | Binder Type[b] | % Extractables at Dosage (Megarad) | | | | | | |
|---|---|---|---|---|---|---|---|---|
| | | 0 | 1 | 2.5 | 5 | 7.5 | 10 | 15 |
| 1 | U/AE | 17.3 | | 8.3 | 7.0 | 5.3 | | |
| 2 | U/AU | 20.2 | 12.1 | 9.0 | 7.0 | 6.1 | 5.3 | |
| 3 | U/AE | 19.0 | 12.3 | 8.6 | 6.4 | 5.5 | 5.1 | |
| 4 | U/AE | 19.4 | 16.2 | 12.9 | 9.8 | 7.7 | 6.4 | |
| 5 | U/AU | 16.7 | 8.0 | 5.1 | 3.5 | | 3.0 | |
| 6 | U/AU | 20.4 | | | 6.7 | | 5.5 | 4.5 |
| 7 | U/AE | 18.6 | 16.5 | 12.7 | 9.1 | 8.1 | .2 | |
| 8 | U/AU | 17.8 | | | 11.6 | | | |
| 10 | U/AE | 21.1 | 9.5 | 6.1 | 4.1 | 3.0 | 3.0 | 2.6 |
| 13 | U/AE | 21.3 | | 5.4 | 3.3 | | | |
| 14 | U/AE | 20.2 | 11.9 | 7.3 | 5.3 | 4.2 | 3.9 | |
| 15 | U/AE | 18.4 | 11.5 | 9.4 | 7.2 | 6.2 | 5.4 | |
| 16 | U/AE | 20.4 | 13.3 | 9.4 | 7.3 | 6.1 | 5.5 | 5.0 |
| 17 | U/AU | 19.6 | 12.1 | 9.9 | 8.0 | 7.6 | 7.2 | 6.4 |
| 18 | U/AU | 19.5 | 11.4 | 8.2 | 6.3 | 5.6 | 5.0 | 4.7 |
| 19 | U/AU | 20.2 | 8.8 | 6.0 | 4.9 | 4.1 | 4.1 | 3.7 |
| 20 | U/AU | 19.6 | 6.5 | 4.1 | 3. | .9 | 2.8 | 2.4 |
| 21 | U/AU | 16.2 | 15. | 12.8 | 10.2 | .6 | 9.0 | 7.5 |
| 22 | U/AU | 15.8 | 11.5 | 9.2 | 7.6 | 6.9 | 6.1 | |
| 23 | U/PE/AE | 21.8 | 15.8 | 12.7 | 9.7 | 8.6 | 8.0 | |
| 24 | U/AU | 19.7 | | 7.3 | 5.8 | 5.2 | | |
| 25 | U/B | 16.5 | 14.8 | 14.9 | 13.7 | 13.4 | | |

-continued

| Example No.[a] | Binder Type[b] | % Extractables at Dosage (Megarad) | | | | | |
|---|---|---|---|---|---|---|---|
| | | 0 | 1 | 2.5 | 5 | 7.5 | 10 | 15 |
| 26 | U/B | 20.8 | 17 | 19.8 | 20.2 | 20.1 | 18.7 | |
| 27 | U/B | 18.1 | 17.9 | 19.8 | 21.3 | 18.8 | 18.7 | |
| 28 | U/B | 16.2 | 16.5 | 16 | 15.7 | 15.2 | 14.7 | 13.3 |
| 29 | U/PE | 18.7 | 18.4 | 18 | 17.4 | 16.9 | 16.2 | 1.0 |
| 30 | U/U | 18.7 | 18.4 | 19.1 | 17.8 | 17.8 | | |
| 31 | U/A | 18.1 | | | 18.2 | | 17.8 | 17.4 |
| 32 | U/PE/AE | 20.1 | 15.1 | 11.9 | 9.2 | 8.4 | | |
| 33 | U/AU | 17.5 | | 7.5 | 6.2 | | | |
| 34 | U/AE | 18.6 | 10.4 | 8.0 | 5.8 | 5.3 | 4.6 | 4.0 |
| 35 | U/AE | 17.8 | 11.1 | 7.6 | 5.5 | 4.5 | 4.4 | 3.9 |
| 36 | U/AE | 15.9 | 11.3 | 8.5 | 6.8 | 5.9 | 5.5 | 4.2 |

[a]See Table II for description of examples.
[b]AE = acrylate ester epoxy, AU = acrylate urethane, PE = polyester, B = butadiene copolymer, U = urethane, A = polyacrylate It should be noted that in Examples 25 through 31, which contain CBAN, ABAN, polyacrylate, polyester and polyurethane, no detectable facile cross-linking was detected upon exposure to electron beam irradiation at dosages utilized herein. Although Examples 25 and 26 represent systems having resins with backbone radiation curable moieties, the percent extractables do not change significantly in a 1 to 15 megarad exposure. Example 30, which is a polyurethane system void of electron beam curable material, represents a commonly used conventional thermoplastic system, which, again, exhibits no cross-linking and little decrease in extractables over the exposure range investigated.

A number of experimental tests were conducted to evaluate and compare the performance of the magnetic tapes prepared in accordance with the present invention. The first has been designated the "6-inch shuttle computer tape durability test" wherein a 6-inch section of tape is recorded with binary "1s" and at an appropriate, density (1600 cpi-characters per inch-or 3200 frpi-flux reversals per inch). The section of tape being tested is repeatedly "read back" while being shuttled on a Storage Technology Corporation Model 3600 tape drive equipped with a Memorex internally designed controller/certifier to program and monitor the test. The section of tape was shuttled until one or more frpi drop below an appropriate level or until a specific number of passes is achieved. It was arbitrarily determined that the limits utilized were 25 percent of the signal remaining or 30,000 forward read passes. Durability was defined in terms of the number of shuttles necessary to achieve the limits established above. Table VI thus lists computer durability for several representative coatings.

TABLE VI

COMPUTER DURABILITY AS A FUNCTION OF RADIATION DOSAGE

| Example No.[a] | Binder Type[b] | K[c] Shuttles at Dosage (Megarad) | | | | | | |
|---|---|---|---|---|---|---|---|---|
| | | 0 | 1 | 2.5 | 5 | 7.5 | 10 | 15 |
| 1 | U/AE | 550 | | 581 | 1100 | 934 | | |
| 2 | U/AU | 16 | 7 | 54 | 333 | 504 | | |
| 3 | U/AE | 9 | 14 | 257 | 200 | 176 | 56 | |
| 5 | U/AU | 44 | 121 | 1000 | 32 | 110 | 411 | |
| 6 | U/AU | 57 | 422 | 177 | 90 | 141 | 148 | 151 |
| 9 | U/AE | 49 | | 122 | 155 | 1000 | | |
| 10 | U/AU | 100 | | 1000 | 118 | 194 | | |
| 11 | U/AU | 49 | | 199 | 385 | 1000 | | |
| 7 | U/AE | 65 | | | 157/268 | | | |
| 8 | U/AU | 298 | | | 473 | | | |
| 23 | U/PE/AE | 31 | 17 | 20 | 29 | 62 | 1000 | |
| 32 | U/PE/AE | 289 | 521 | 1000 | 1000 | 1000 | | |

[a]See Table II for description of examples.
[b]U = urethane, AE = acrylate ester epoxy, AU = acrylate urethane, PE = polyester.
[c]K = 1000

As noted by viewing Table VI, computer durability generally increases with irradiation, peak durability usually being observed in the range of 2.5 to 7.5 megarad. There are exceptions such as Example 6 which exhibits peak durability at 1 megarad dosage.

The tapes of the present invention were also subjected to a "video drum durability tester". In this test, a Memorex designed video still frame durability tester was used. This tester consists of an Ampex Mark IX video head ISA, Type K, equipped with a chromel-p/alumel thermocouple fabricated in a mode that will simulate still-framing on a helical scan video recorder. Tape tension was determined by hanging weights, while head-tape velocity was controlled by a variable speed DC motor and controller and head penetration was controlled by appropriate instrumentation. Surface durability failure was indicated by a temperature change at the tape head interface as measured by the head thermocouple and chart recorder. Durability was defined in terms of minutes necessary for the temperature to change at the tape/head interface. Table VII lists video durability for several representative coatings.

TABLE VII

VIDEO DRUM DURABILITY AS A FUNCTION OF RADIATION DOSAGE FOR REPRESENTATIVE SYSTEMS

| Example No.[a] | Binder Type[b] | Minutes at Dosage (Megarad) | | | | | | |
|---|---|---|---|---|---|---|---|---|
| | | 0 | 1 | 2.5 | 5 | 7.5 | 10 | 15 |
| 33 | U/AU | 9.5 | | 13.7 | 11.7 | | | |
| 34 | U/AE | 16 | 18 | 19 | 18 | 16 | 11 | 16 |
| 35 | U/AE | 14 | 22 | 42 | 29 | 51 | 28 | 28 |

TABLE VII-continued

VIDEO DRUM DURABILITY AS A FUNCTION OF
RADIATION DOSAGE FOR REPRESENTATIVE SYSTEMS

| Example No.[a] | Binder Type[b] | Minutes at Dosage (Megarad) | | | | | |
|---|---|---|---|---|---|---|---|
| | | 0 | 1 | 2.5 | 5 | 7.5 | 10 | 15 |
| 36 | U/AE | 0.6 | 0.6 | 0.4 | 1.0 | 11.6 | 7.3 | 9 |

[a]See Table II for description of Examples.
[b]U = urethane, AE = acrylate ester epoxy, AU = acrylate urethane.

What has been disclosed are new compositions of matter and magnetic recording tapes made therefrom which are not impacted by environmental, operator or process constraints. The new binders can be cross-linked after all process operations such as dispersion, coating, surface treatment etc. are completed. The new compositions do not have a "pot life" or a critical surface treatment window since the new compositions of matter are not affected by atmospheric conditions. As noted from the various tables above, the new compositions exhibit excellent mechanical properties and, in fact, possess mechanical properties which are better than binder systems produced by free radical initiators.

The novel compositions of matter of the present invention cross-link without the need for post-cure heating. Elimination of post-cure heating substantially removes problems, such as rollset and/or substrate distortion. The present system cross-links immediately upon exposure to electron beam irradiation while prior art systems require prolonged and finite storage at some predetermined cure temperature or regime in order to attain maximum cross-link density or properties. This cure cycle can vary from hours to days depending upon the chemistry and temperature involved.

What is claimed is:

1. A magnetic recording medium including magnetic particulates in a cured resin matrix on a backing film, wherein prior to curing the resin matrix comprises a binder material including a radiation-curable material and a material which is not cured by radiation such that cure thereof produces an interaction yielding a soft/-hard segment binder system forming a semi-interpenetrating network whose recording-related characteristics are determined by the ratio of curable to non-curable materials; this binder material comprising polyurethane and a resin amenable to radiation curing.

2. The combination as recited in claim 1 wherein the radiation-curable material comprises an acrylate urethane or an acrylate ester epoxy with no free isocyanate group, and wherein material which is not cured by radiation is polyurethane.

3. The combination as recited in claim 2 wherein irradiation of the radiation-curable material is performed after calendering.

4. An enhanced-durability magnetic recording medium including magnetic particulates in a cured resin matrix on a backing film, wherein prior to curing the resin matrix comprises a binder material including a radiation-curable material and a material which is not cured by radiation such that cure thereof produces an interaction yielding a soft/hard segment binder system, wherein the radiation-curable material is hard and does not react with the non-curable material which is soft, but combines therewith in a semi-interpenetrating network.

5. A method of fabricating a magnetic recording medium having magnetic particulates in a resin matrix, said method comprising the steps of
   preparing said resin to include binder material comprised of a radiation-curable material and a material which is not cured by radiation such that cure thereof produces an interaction yielding a soft/-hard segment binder system whose recording-related characteristics are determined by the ratio of curable to non-curable materials;
   intermixing the magnetic particulates with the binder system;
   applying the binder system with intermixed magnetic particulates to a backing film; and
   curing the system, whereby an interpenetrating network of the soft and hard binder segments is formed.

6. The method as recited in claim 5 wherein the binder material comprises polyurethane and a resin amenable to radiation curing.

7. The method as recited in claim 6 wherein the radiation-curable material is selected to comprise an acrylate urethane or an acrylate ester epoxy with no free isocyanate group.

8. The method as recited in claim 7 wherein the irradiation curing is performed after calendering.

9. A method for fabricating a magnetic recording medium, said method comprising:
   mixing a polyurethane solution, a magnetic pigment, and an electron-beam curable material to obtain a dispersion;
   coating the dispersion on a backing film; and
   exposing the coated dispersion to a preselected dosage of electron-beam radiation to selectively cross-link the electron-beam curable material, whereby the electron-beam curable material is cured and the cured material and polyurethane solution form a semi-interpenetrating network of a soft/hard binder for the magnetic pigment.

10. A method as in claim 9, wherein the dosage of electron beam radiation is in the range from about 1 to 15 megarad.

11. A method as in claim 9, wherein the polyurethane is a polyester polyurethane.

12. A method as in claim 9, wherein the electron beam curable material is selected from the group consisting of acrylate and methacrylate ester epoxy resins, and acrylate and methacrylate urethane resins.

13. A magnetic recording medium produced by the method of claim 9.

* * * * *